United States Patent [19]

Murakami et al.

[11] Patent Number: 4,800,430
[45] Date of Patent: Jan. 24, 1989

[54] FUNDAMENTAL UNIT FOR PROCESSING VIDEO SIGNALS

[75] Inventors: Keinosuke Murakami, Machida; Kazumasa Enami, Atsugi; Nobuyuki Yagi, Kawasaki, all of Japan

[73] Assignee: Nippon Hoso Kyokai, Tokyo, Japan

[21] Appl. No.: 879,108

[22] Filed: May 30, 1986

[30] Foreign Application Priority Data

Oct. 1, 1984 [JP] Japan ................................. 59-204156
Sep. 30, 1985 [JP] Japan .................. PCT/JP85/00539

[51] Int. Cl.⁴ .............................................. H04N 5/14
[52] U.S. Cl. .................................... 358/160; 358/181; 358/183
[58] Field of Search ................. 358/160, 181, 22, 182, 358/183, 185; 382/41, 49

[56] References Cited

U.S. PATENT DOCUMENTS

| | | | |
|---|---|---|---|
| 3,627,914 | 12/1971 | Davies | 358/185 |
| 4,218,709 | 8/1980 | Baxter et al. | 358/181 |
| 4,218,710 | 8/1980 | Koshigi et al. | 358/22 |
| 4,308,559 | 12/1981 | Schiff . | |
| 4,339,803 | 7/1982 | Michael et al. . | |
| 4,689,823 | 8/1987 | Wojcik et al. | 382/41 |

FOREIGN PATENT DOCUMENTS

| | | | |
|---|---|---|---|
| 0047701 | 1/1977 | Japan | 358/183 |
| 0130830 | 10/1979 | Japan . | |
| 0096464 | 6/1983 | Japan . | |
| 0014945 | 4/1984 | Japan . | |

OTHER PUBLICATIONS

Masatsugu Kidode, "Image Processing Machines in Japan," Computer, vol. 16, No. 1, Jan. 1983, pp. 68-80, IEEE.

Primary Examiner—James J. Groody
Assistant Examiner—David E. Harvey
Attorney, Agent, or Firm—Spencer & Frank

[57] ABSTRACT

A video signal processing system having a plurality of units to be operated in parallel with each other. Each unit has an input selector for selecting one video input and output selectors for selecting one video output. The selected video input is initially stored in a memory and is processed in accordance with a program which is stored in another memory in a sequencer to execute a specific video effect. The video signal subject to the video effect is supplied to the output selectors and delivered from the selected output selector. This processing is performed in parallel with respect to the units in accordance with respective programs stored in the respective memories in the respective sequencers.

9 Claims, 15 Drawing Sheets

FIG. 5A   FIG. 5B
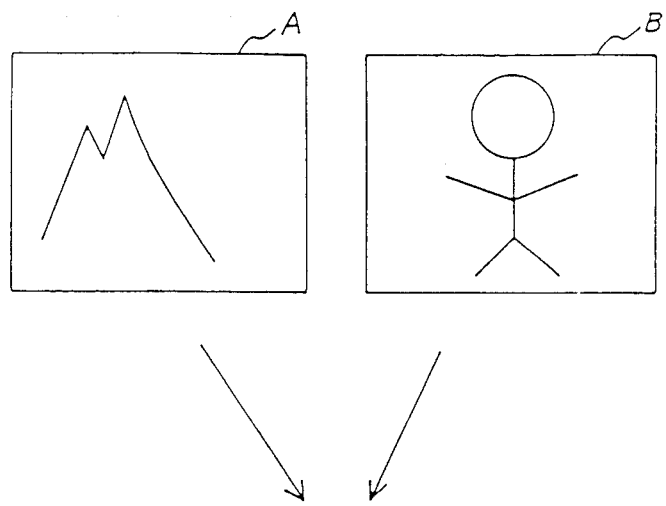
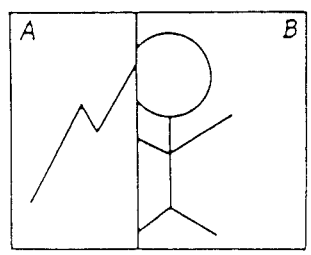
FIG. 5C

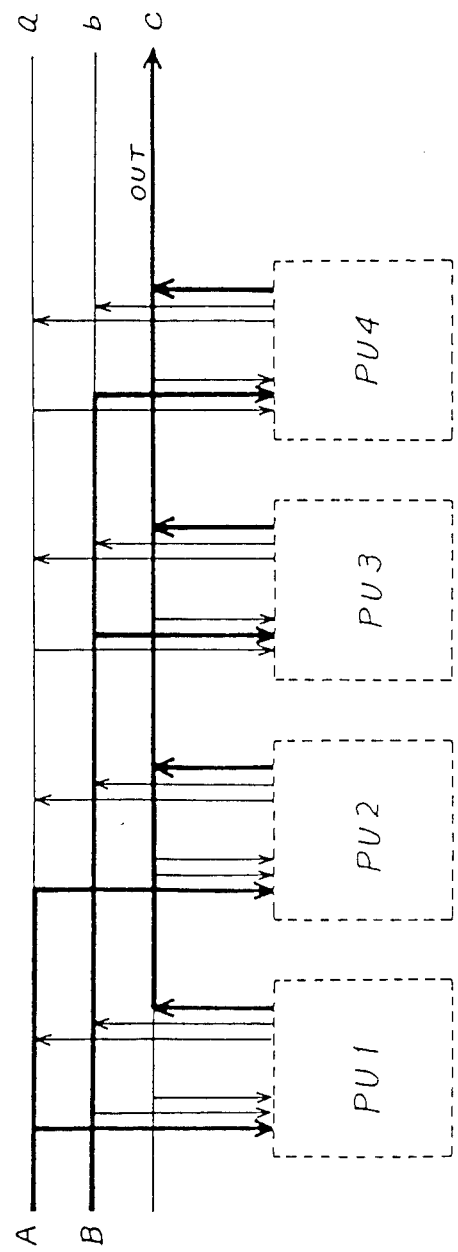

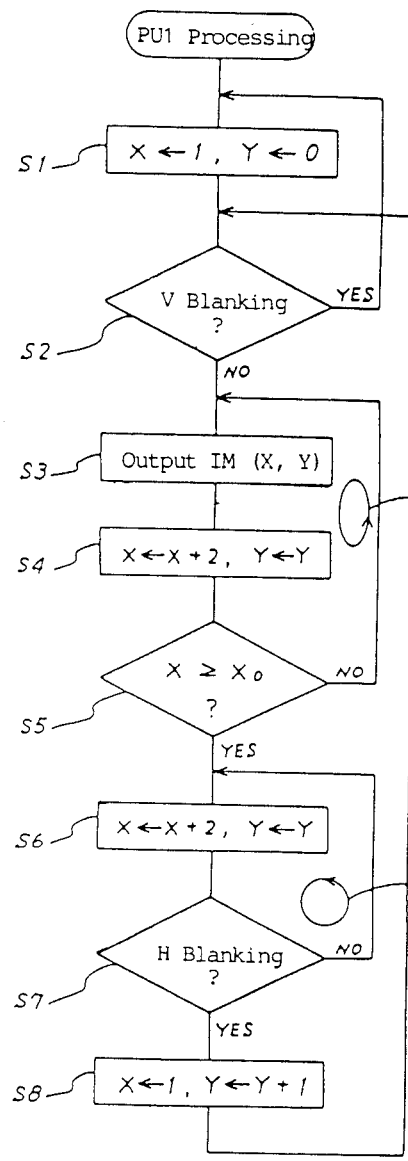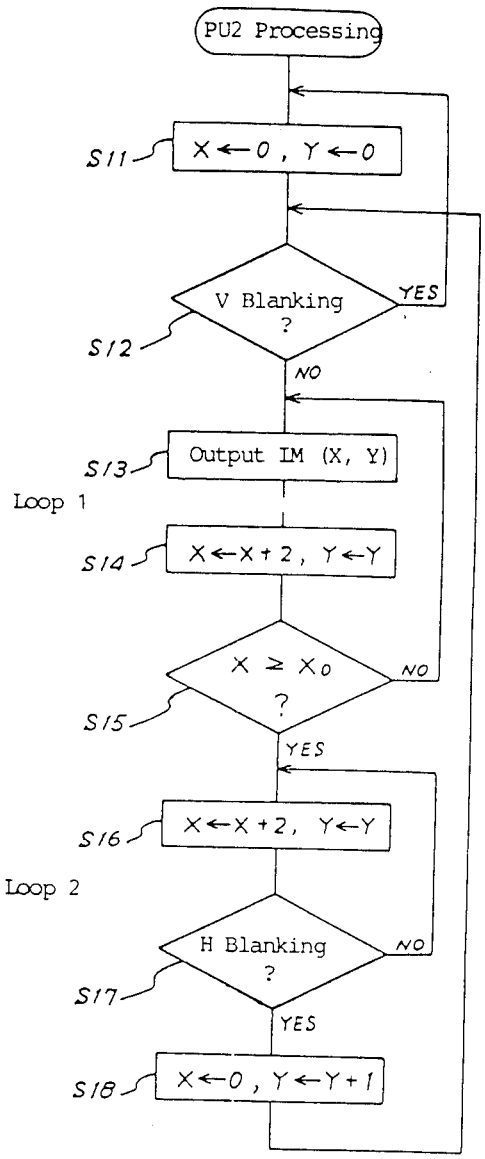
FIG. 7A
FIG. 7B

FIG. 8A
FIG. 8B
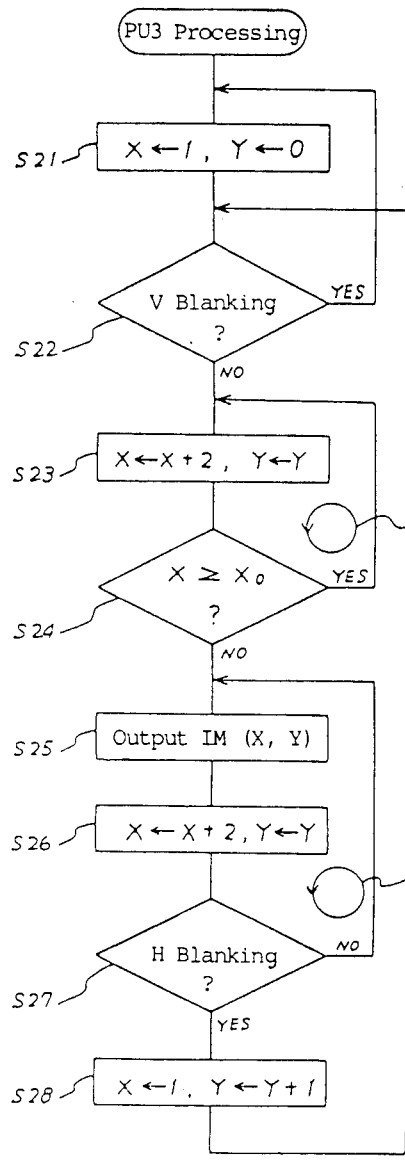
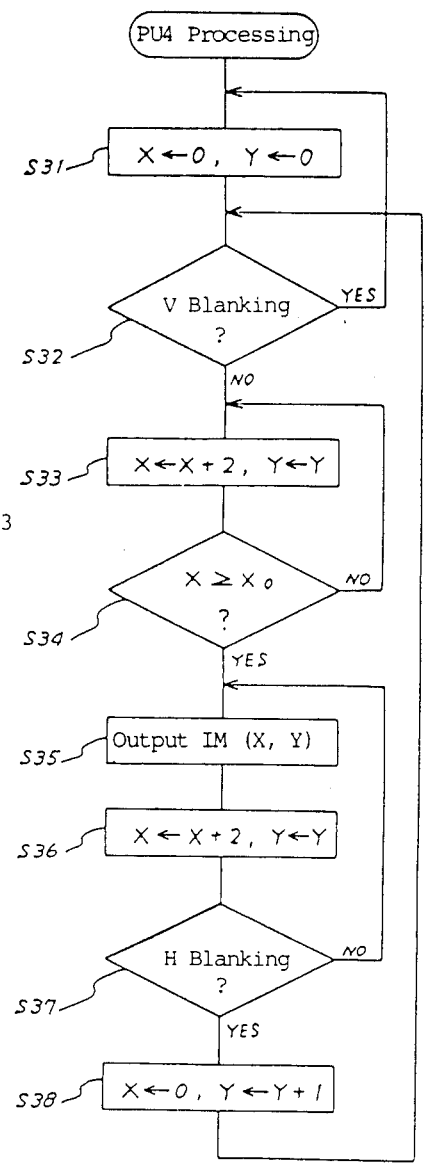

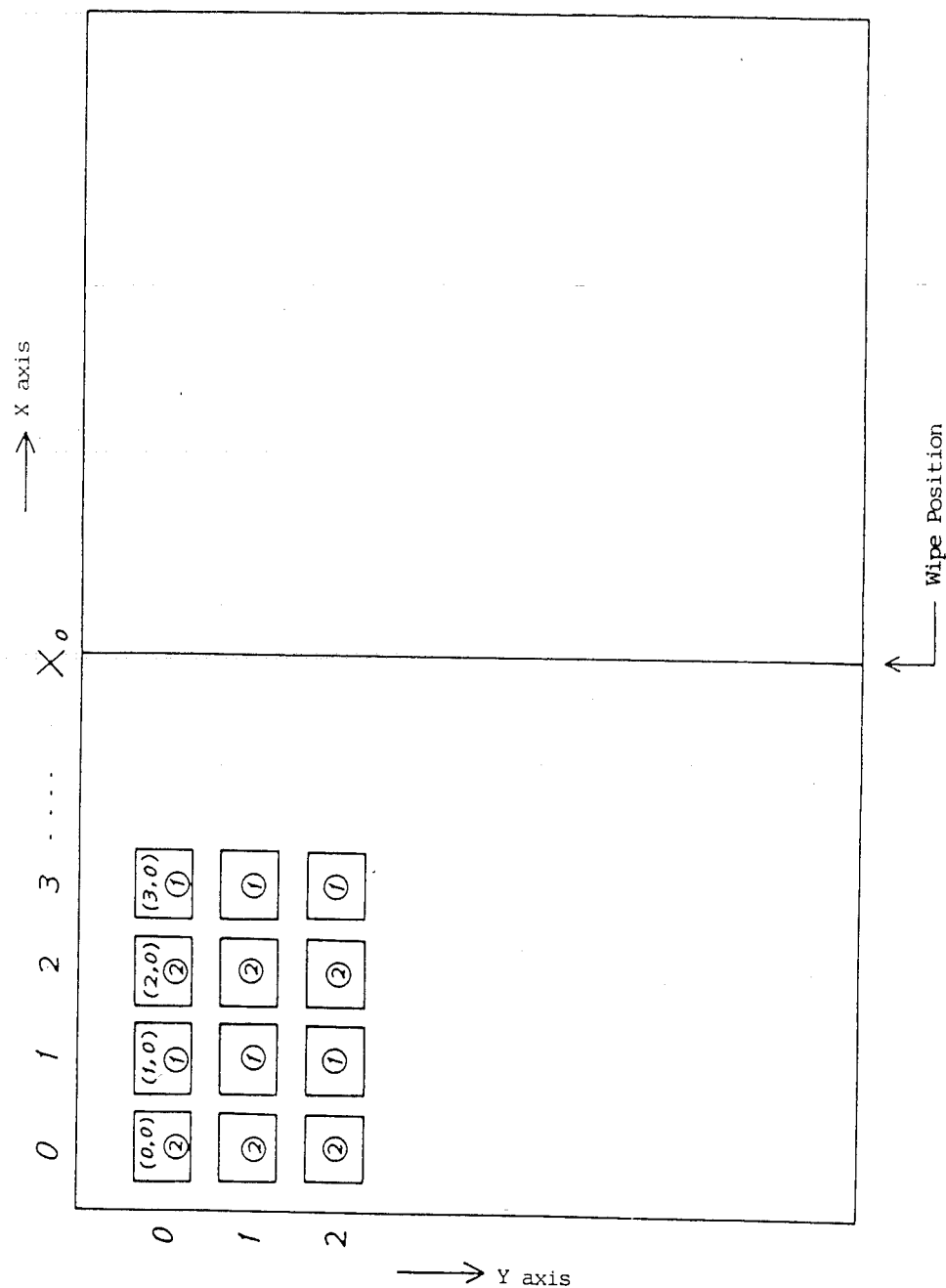

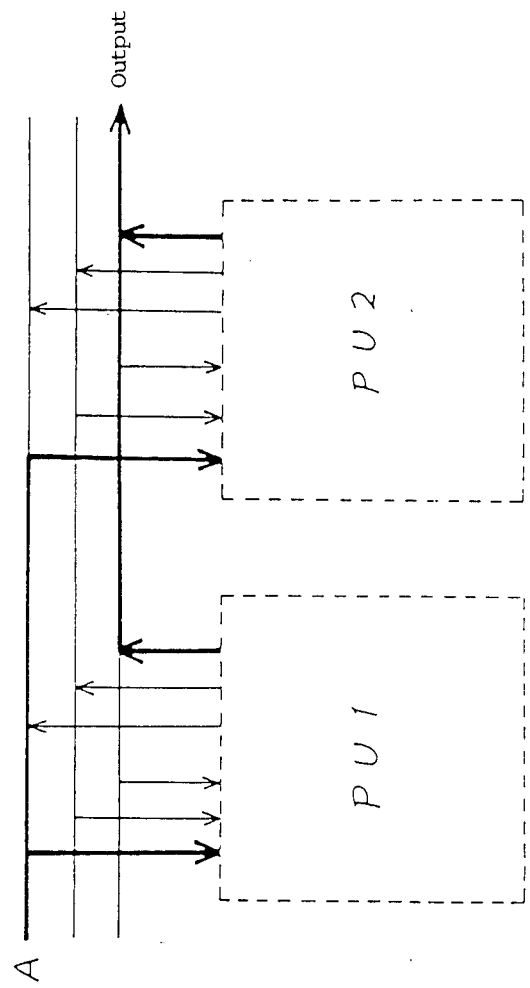

FUNDAMENTAL UNIT FOR PROCESSING VIDEO SIGNALS

BACKGROUND OF THE INVENTION

The present invention relates to a fundamental unit of processing a video signal in the form of raster scanning and more particularly to a fundamental unit for processing a video signal continuously in real time without any interruption.

One of the examples of a video signal obtained by raster scanning is a television signal. It is well known in the art that various processings of a television signal include processings on an amplitude axis, on a frequency axis and on a time axis and geometrical transformation of a picture.

So far, in order to effect such various processings, specific circuits and devices for accomplishing specific functions have been used. For instance, to provide correction of the time axis, a time base corrector and a frame synchronizer have been used and in a case of geometrical transformation, a digital video effector or the like has been used.

These circuits and devices, however, only have respectively specified functions and consequently cannot readily be applied for other purposes and cannot readily be expanded to accomplish other functions.

In order to explain in more detail prior art circuits and devices of the types described above, one example of a conventional program production system is shown in FIG. 1. In FIG. 1, the outputs from TV cameras A and B are provided to a switcher 102 directly and through an image quality correction circuit 101. Video signals other than NTSC signal are applied through a system conversion unit 103 to the switcher 102. A video signal which is not synchronized and transmitted from another station is applied through a frame synchronizer 104 to the switcher 102. A video signal which has been suitably selected by the switcher 102 is applied through a mixing/effect amplifier 105 to a digital video effector (DVE) 106 so that a desired synthesized picture output is derived from the DVE 106.

However, the system as shown in FIG. 1 has the following problems.

(1) When a new function is needed, a specific circuit or device capable of accomplishing such function must be designed and fabricated additionally.

(2) In the system as shown in FIG. 1, when the insertion positions of, for example, the frame synchronizer 104, the image quality correction circuit 101 or the digital video effector 106 must be changed, it is necessary to change the wiring system.

(3) Novel special effects are demanded one after another, so that hardware capable of accomplishing such special effects must be fabricated, even when the frequency of use of such special effects is very small.

(4) A specific design idea must be employed in designing and fabricating a program production system depending upon whether the program production system is used specifically for relay broadcasting, or for broadcasting a program made in a studio, or news broadcasting. As a result, the program production system becomes very expensive.

As described above, a conventional program production system cannot be expanded and does not have versatility. In addition, a conventional program production system is not economical. Furthermore, even though various program production methods are employed at present, a conventional program production system is not adapted flexibly to satisfy such demands.

A digital computer capable of accomplishing desired processings by means of programmable logic circuits is known. Since the sampling cycle of a digital video signal is generally several tens of nano seconds, a ultra-high-speed computer is needed in order to accomplish such complicated processings of respective picture elements in the manner described above. As a result, a programable production system employing such digital processing becomes large-scale and very expensive.

SUMMARY OF INVENTION

In view of the above and the fact that from the standpoints of cost and maintenance it is advantageous to realize a single hardware system capable of accomplishing various functions rather than to design and fabricate various specific devices, each capable of accomplishing a single specific function one after another, one of the objects of the present invention is to provide a fundamental unit for processing a video signal which can substantially overcome the above and other problems encountered in the prior art.

It is another object of the present invention to provide a fundamental unit for processing a video signal in which only one kind of hardware device is used to process video signals continuously in real time in various manners.

BRIEF DESCRIPTION OF THE DRAWINGS

FIGS. 5A, 5B and 5C are explanatory diagrams used to explain vertical wipe processing;

FIG. 6 is a block diagram showing one example of a system wherein four fundamental units for processing video signals are used;

FIGS. 7A, 7B, 8A and 8B are flowcharts showing an example of steps for controlling the system shown in FIG. 6;

FIG. 9 is an explanatory view used to explain an arrangement of picture elements formed on a display screen in accordance with the algorithm shown in FIGS. 7A, 7B, 8A and 8B;

FIG. 12 is a block diagram showing an example of a system in which two fundamental units for processing a video signal are used to accomplish reduction processing in parallel;

DESCRIPTION OF THE PREFERRED EMBODIMENTS

Figure 1:
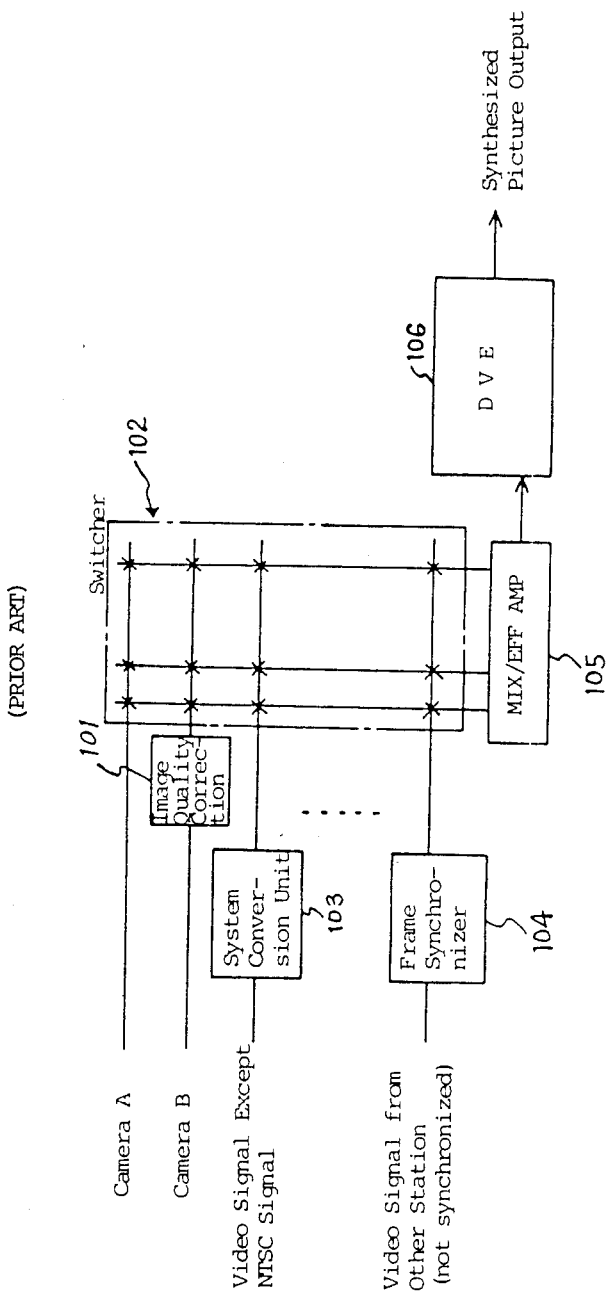
FIG. 1 is a block diagram showing a prior art program production system.
Figure 2:
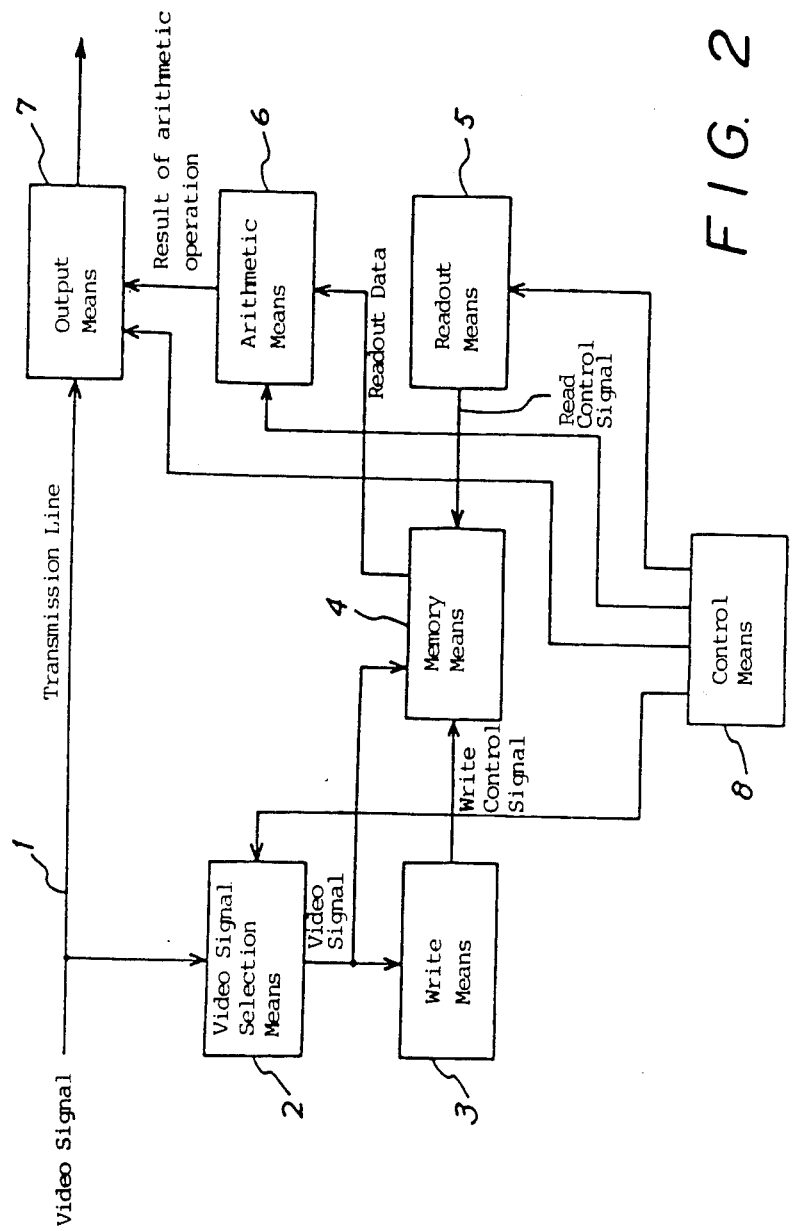
FIG. 2 is a block diagram showing one embodiment of the overall arrangement of the present invention.

FIG. 2 is a block diagram showing an embodiment of the overall arrangement of the present invention. In FIG. 2, reference numeral 1 designates a transmission line system for transmitting a plurality of video signals which include sync signals. It suffices to provide the number of transmission lines which are sufficient to transmit the video signals to be processed. When time-division multiplexing is employed to transmit the video signals, the number of transmission lines 1 can be decreased. Reference numeral 2 denotes a video signal selection means which selects a video signal from the video signals on the transmission lines 1 and which is controlled by a control means 8 to be described below.

Reference numeral 3 denotes a write means for storing the video signal into a memory means 4 to be described hereinafter, by using the sync signal of the video signal obtained from the video signal selection means 2 as a write control signal.

Reference numeral 4 denotes the memory means which temporarily stores the video signal data. The write control for the video signal data is provided by the write means 3, while the readout control is provided by a readout means 5 to be described hereinafter. If the storage capacity of the memory means 4 is one frame, a frame synchronization conversion function (to be described in detail hereinafter) can be realized.

Reference numeral 5 denotes the readout means adapted to read data required by an arithmetic means out of the memory means 4 under the control of a control means 8.

Reference numeral 6 denotes the arithmetic means adapted to carry out predetermined arithmetic operations on the data obtained by the readout means 5.

Reference numeral 7 denotes an output means adapted to transmit the result of the arithmetic operation carried out by the arithmetic means 6 to the transmission line 1 under the control of the control means 8. The output means 7 has the function of passing therethrough data on the transmission line 1 as they are, in addition to the transmission of the result outputted from the arithmetic means 6. This function is needed when a plurality of fundamental units are interconnected as will be described in detail hereinafter.

The control means 8 responds to a sync signal other than the sync signal in the input video signal to effect various controls.

The specific controls by the control means 8 are as follows.

The control means 8 supplies a selection signal and a timing signal to the video signal selection means 2. The control means 8 controls the readout means 5 in such a way that the readout means 5 generates the address of data required by the arithmetic means 6. The control means 8 delivers commands to the arithmetic means 6, so that an arithmetic operation on data read out from the memory means 4 is carried out. The control means 8 precisely controls the output means 7, so that the data on the transmission line 1 passes through the output means 7, or the data derived from the arithmetic means 6 is outputted from the output means 7 at a precisely controlled timing.

Even when only one fundamental unit according to the present invention is used, the processing on a time axis (to be described in detail hereinafter) can be accomplished by the write means 3, the memory means 4 and the readout means 5. Furthermore, the conversion of data can be accomplished by the functions of the arithmetic means 6.

Figure 3:
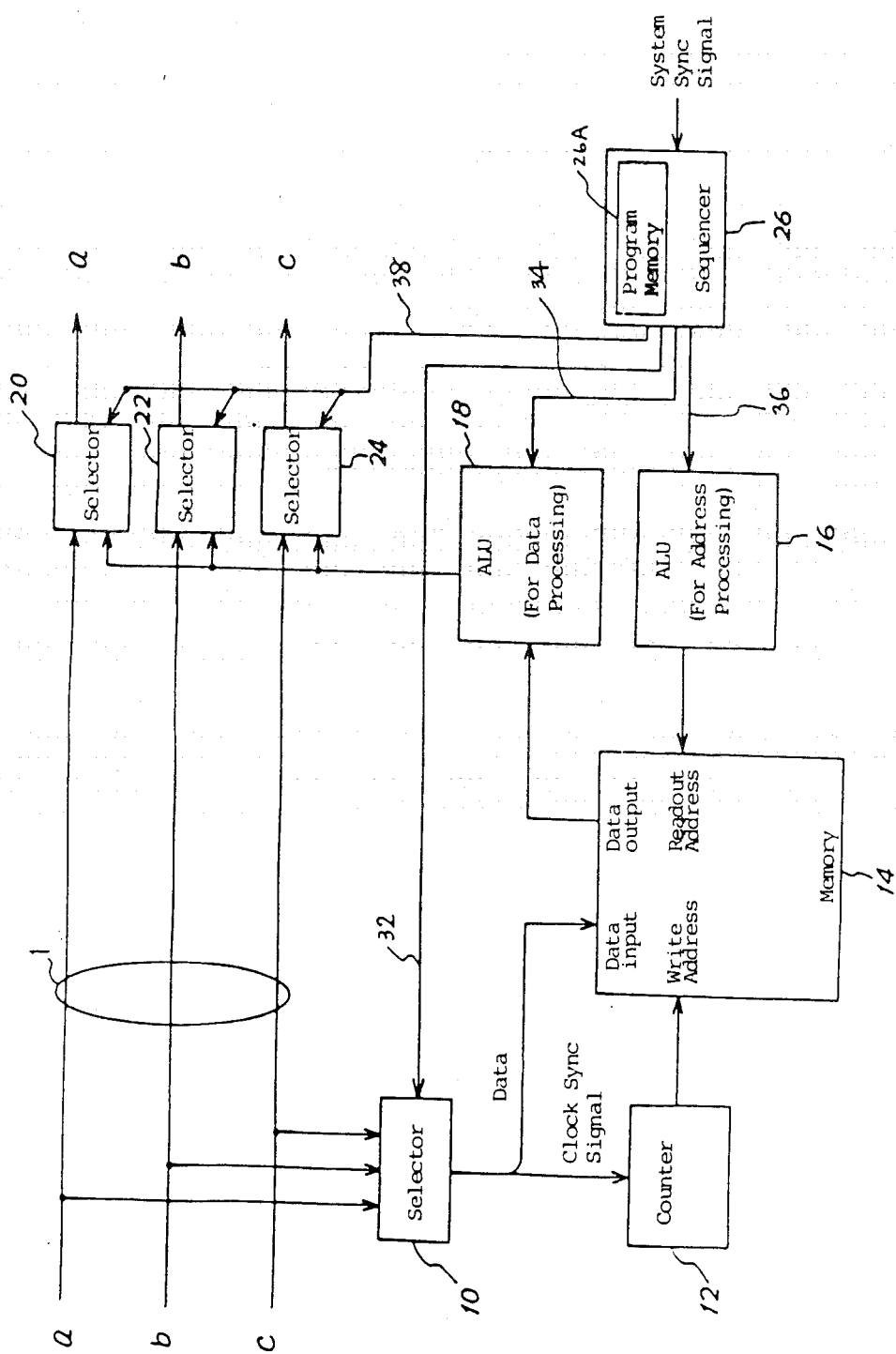
FIG. 3 is a block diagram showing a specific embodiment of the present invention.

FIG. 3 is a block diagram showing a more specific embodiment of the present invention. In this embodiment, three transmission lines a, b and c are provided so as to transmit three kinds of video signals.

First, a selector 10 selects a desired video signal on one of the three transmission lines a, b and c. An address counter 12 is controlled by using the sync signal included in the selected video signal.

Figure 4:
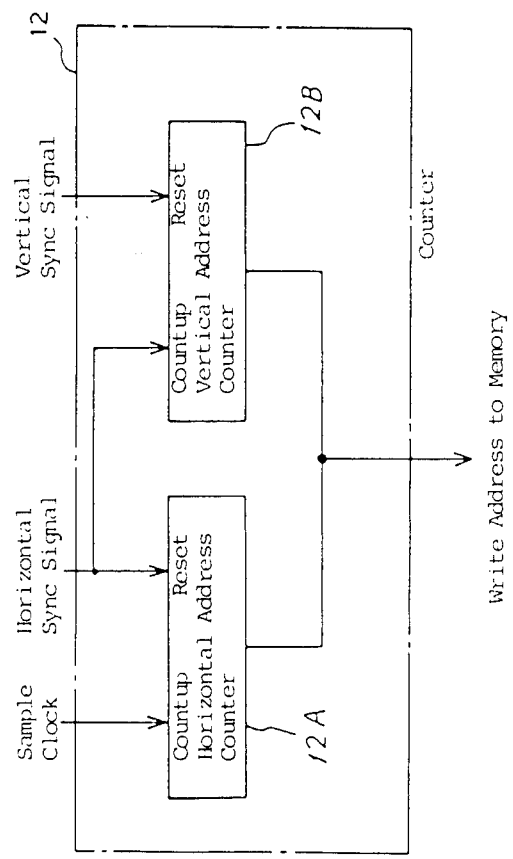
FIG. 4 is a block diagram showing the detailed arrangement of a counter 12 shown in FIG. 3.

FIG. 4 shows a detailed arrangement of the address counter 12. Here, reference numeral 12A denotes a horizontal address counter and reference numeral 12B denotes a vertical address counter. A sample clock from a sequencer 26 to be described hereinafter is applied to the countup input terminal of the horizontal address counter 12A. The horizontal sync signal from the selector 10 is applied to the reset input terminal of the horizontal address counter 12A and the countup input terminal of the vertical address counter 12B. The vertical sync signal from the selector 10 is applied to the reset input terminal of the vertical address counter 12B.

Referring back to FIG. 3, reference numeral 14 denotes the memory for storing the video signal and has a memory capacity for storing one frame of video information. In response to the address delivered from the address counter 12, the video signal selected by the selector 10 is sequentially stored in the memory 14. Meanwhile, in response to an address outputted from an arithmetic logic unit 16 for address processing, the data stored in the memory 14 is read out and supplied to an arithmetic logic unit 18 for data processing.

The arithmetic logic unit 18 for data processing processes the data according to a predetermined program stored in a program memory 26A to be described hereinafter.

In order to supply the output from the arithmetic logic unit 18 to one of the transmission lines a, b and c, selectors 20, 22 and 24 are used. When the input side of the selector 20 is selected to the arithmetic logic unit 18, the signal transmitted on the transmission line a is interrupted and the output data from the arithmetic logic unit 18 is transmitted to the transmission line a. When the input side transmission lines b and c are selected by the selectors 22 and 24, the input side transmission lines b and c and the output side transmission lines b and c are interconnected, respectively. The sequencer 26 controls not only the above-described selections but also the arithmetic logic units 16 and 18.

When transmission time delay due to the passage of the video signal through the selectors 20, 22 and 24 causes a problem, latches (not shown) are connected to the outputs of the selectors 20, 22 and 24, so that a timing position at which the video signal is sampled is determined. The arithmetic logic units 16 and 18 are designated ALUs in general and perform all arithmetic operations such as addition, subtraction, multiplication, division and other functional operations such as exponential functions, logarithmic functions and so on, as well as all logic operations such as AND, OR, NOT and so on. That is, each of the arithmetic logic units 16 and 18 functions as a part of a CPU. The sequencer 26 incorporates the program memory 26A and controls the arithmetic logic units 16 and 18 and the selectors 10, 20, 22 and 24 according to steps of programs to be described in detail hereinafter, in response to a sync signal for driving the fundamental unit (to be referred to as "system sync signal" hereinafter which is in general a vertical sync signal VD).

The respective portions of the circuit shown in FIG. 3 can be formed by the following devices:

| | |
|---|---|
| selector 10 | 74LS153 |
| counter 12 | 74LS163 |
| memory 14 | HM6167 (product of Hitachi Seisakusho KK.) and 74LS157 for selecting write or readout addresses |
| arithmetic logic unit 16, 18 | Am2901 (product of Advanced Micro Devices Corp.) |
| selectors 20, 22, 24 | 74LS157 |
| sequencer 26 | Am2910 and Am93422 (product of Advanced Micro Devices Corp.) which is used as a program memory. |

In response to the system sync signal, the sequencer 26 outputs the control signals for actuating respective component parts to the following control lines 32, 34, 36 and 38.

(1) Input control line 32

The control signal on the input line 32 controls the selection of one of the video signals transmitted through the transmission lines a, b and c.

(2) Data processing control line 34

The control signal on the data processing control line 34 controls the arithmetic logic unit 18 for data processing, so that the data from the output terminal of the memory 14 is processed according to an instruction (for instance, multiplication) of the control signal.

(3) Address processing control line 36

In order to obtain data which is required by the arithmetic logic unit 18 for data processing, it is necessary to give a readout address to the memory 14. The control signal on the address processing control line 36, therefore, controls the address processing of the arithmetic logic circuit 16 for address processing in order to generate a readout address.

(4) Output control line 38

The control signal on the output control line 38 controls the selectors 20, 22 and 24, so that the output from the arithmetic logic unit 18 is transferred to one of the transmission lines a, b and c or so that the video signals transmitted through the transmission lines a, b and c pass through the selectors 20, 22 and 24 as they are.

Figure 15:
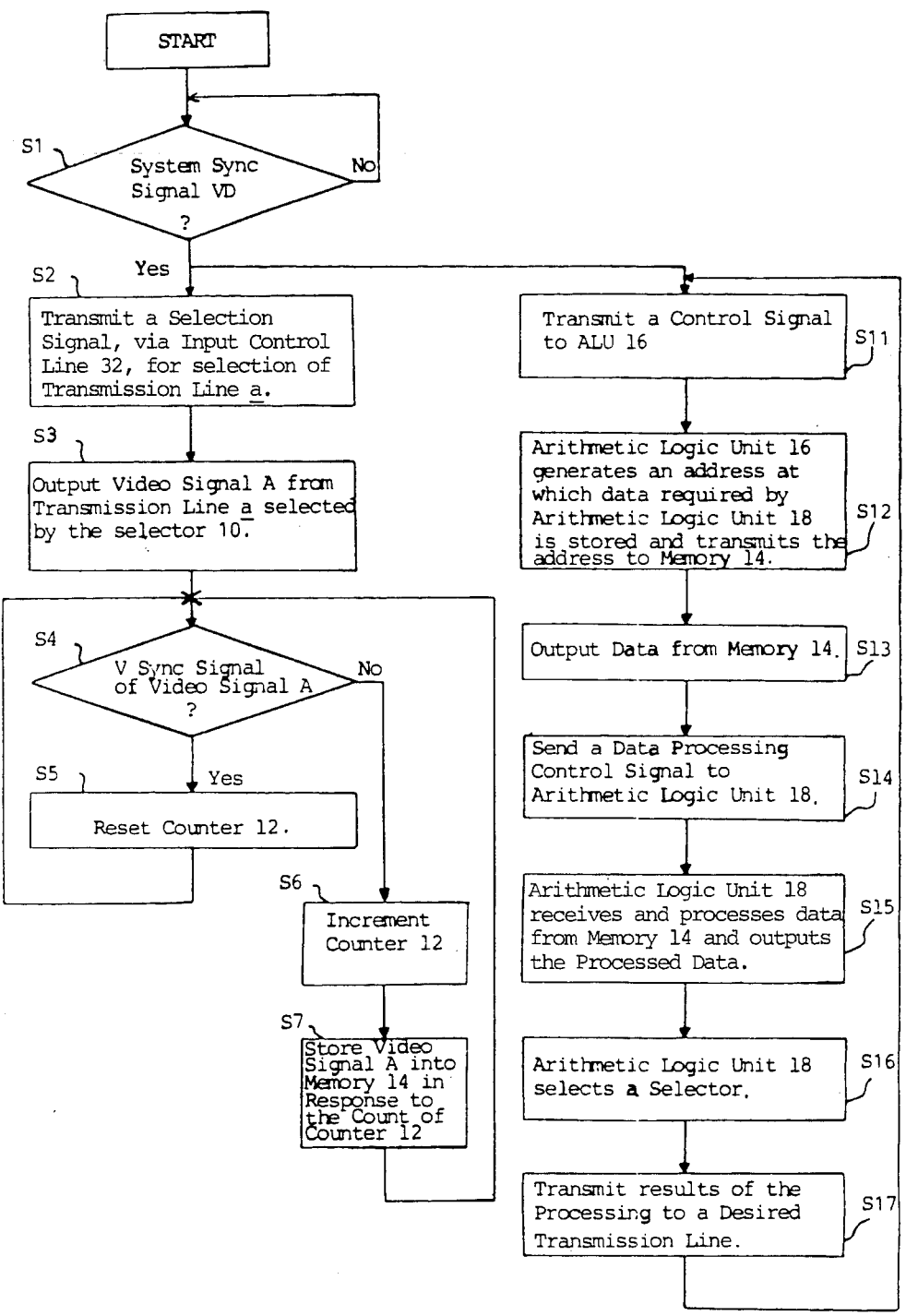
FIG. 15 is a flowchart illustrating steps for controlling a sequencer.

The control steps performed by the sequencer 26 are stored in the program memory 26A and one example of the control steps is shown in FIG. 15.

At step S1, when the sequencer 26 receives the vertical sync signal VD as a system sync signal, the next steps S2 and S11 are executed and the respective steps succeeding steps S2 and S11 are executed in parallel.

At step S2, the sequencer 26 delivers a selection signal through the input control line 32 to the selector 10, so that, for example, the transmission line a is selected.

Therefore, at step S3, the selector 10 selects the video signal A on the transmission line a and at step S4 the vertical sync signal of the video signal A is detected. Upon detection of the vertical sync signal, step S5 is executed so that the counter 12 is reset and starts its counting operation. Thereafter, step S6 is executed so that the counter 12 is incremented. At the next step S7, in response to the address value derived from the counter 12, the video signal A is stored in the memory 14. The above-described steps S4, S6 and S7 are sequentially repeated under the control of the sequencer 26, so that the selected video signal is processed in a desired manner.

Meanwhile, at step S11, in synchronism with the system sync signal VD, the sequencer 26 delivers an address processing control signal through the address processing control line 36 to the arithmetic logic unit 16 for address processing. At step S12, in response to the control signal, the address for reading out from the memory 14 the data required by the arithmetic logic unit 18 for data processing is generated and delivered to the memory 14. At step 13, in response to the readout address, data is read out from the memory 14.

Subsequently, step S14 is executed so that the sequencer 26 delivers a control signal to the arithmetic logic unit 18 for data processing to process the data thus read out. At step S15, under the control of the above-described control signal, the arithmetic logic unit 18 receives the data outputted from the memory 18 and processes the data under the control of the above-described control signal. The processed data is outputted to the selectors 20, 22 and 24.

At the subsequent step S16, the sequencer 26 controls the selectors 20, 22 and 24 to determine from which selector (for instance, the selector 22) a desired output from the arithmetic logic unit 18 is to be conveyed. As a result, at step S17, the processed data output is transmitted to the transmission line b. The above-described steps S11–S17 are sequentially repeated under the control of the sequencer 26, so that the desired video signal is processed in the desired video signal processing manner and delivered from the desired transmission line.

The fundamental unit for processing a video signal described above can be used as a unit and furthermore a plurality of fundamental units can be connected to the same transmission line so that the video signal can be processed in parallel. That is, even if the processing speed is slow when only one fundamental unit is used, so that the video signal cannot be processed in real time, the arithmetic operation speed can be increased by processing the video signal in parallel. And as a result complicated processing can be accomplished. Such parallel processing will be described in detail hereinafter.

If it is assumed that a sampling frequency of the video signal is 1/Ts [Hz] (where Ts is a sampling interval) and that a processing speed of the unit in accordance with the present invention is 1/Tp (times/sec; where Tp is the time required for accomplishing one processing step), it is only possible to execute Ts/Tp processing steps per one sampling point. When n (>Ts/Tp) processing steps are required to accomplish the desired processing, the number N of units of the present invention required are obtained as follows:

$$N = \frac{n}{Ts/Tp}.$$

For instance, let us consider a case in which two video signals A and B, which are not synchronized with each other, are synthesized by a vertical wipe while the two signals are converted to be synchronized with the system synchronization. Here, the vertical wipe is such that two inputs A and B as shown in FIGS. 5A and 5B are split vertically and synthesized to be displayed as shown in FIG. 5C.

If a video signal processing fundamental unit of the present invention has Tp=140 n sec and Ts=280 n sec and n=8 steps are needed to generate one picture element when synthesizing a picture, N=4 fundamental units are needed.

FIG. 6 shows a system structure using four (N=4) fundamental units. Here PU1–PU4 denote the fundamental units. The characters a, b and c on the right-hand side in the drawing designate three transmission lines.

The fundamental units PU1 and PU2 are assigned to a system for processing the video input signal A; that is, for processing the left-hand half of a wipe-synthesized picture. The fundamental units PU3 and PU4 are assigned to a system for processing the video input signal B; that is, for processing the right-hand half of the wipe-synthesized picture. The fundamental units PU1 and PU3 process odd number addresses of the memory 14 (see FIG. 3) while the fundamental units PU2 and PU4 process even number addresses thereof.

In the fundamental units PU1 and PU2, the selector 10 (see FIG. 3), which functions as a means for selecting the video signal, selects the video input signal A, while the fundamental units PU3 and PU4 similarly select the video input signal B. As will be described in more detail hereinafter, these selected video signals are synchronized with the frame sync signal by the counter 12, the frame memory 14 and the arithmetic logic unit 16 for address processing.

In order to deliver the synthesized video output signal to the transmission line c, an output signal corresponding to the left-hand half of the picture shown in FIG. 5C is transmitted from the fundamental units PU1 and PU2 through the respective selectors 24 (see FIG. 3), while an output signal corresponding to the right-hand half of the picture is transmitted from the fundamental units PU3 and PU4 through the respective selectors 24. As a result, a complete video signal series is outputted to the transmisson line c.

FIGS. 7A, 7B, 8A and 8B are flowcharts showing one example of a program stored in the sequencer 26 as control steps of the system described above with reference to FIG. 6.

FIG. 9 illustrates a synthesized picture obtained as a result of the vertical wipe processing. The horizontal coordinate is represented by X and the vertical coordinate is represented by Y. A specific address in the memory is denoted by (X, Y) and the wipe position of a specific picture is represented by $X_0$.

As shown in FIG. 7A, the fundamental unit PU1 designates the address (1, 0) (Step S1) and then waits for the completion of the vertical blanking period of the system synchronization (Step S2).

Upon the completion of the vertical blanking period, the content at the address (1, 0) of the memory is read out (that is, video image data IM) and delivered to the transmission line c (Step S3).

Subsequently, the value of X is incremented by "2" (Step S4) and, if the value of X has not reached the wipe position $X_0$ (Step S5), the program returns to Step S3 to read out the content at the address (3, 0) to deliver the read out content to the transmission line c.

Thereafter, the value of X is incremented by "2" again, so that the video data are read out from the addresses (5, 0), (7, 0) and so on (Loop 1). When the value of X reaches the wipe position $X_0$, the process goes out of the loop 1 and enters the loop 2 (Steps S6 and S7). In the loop 2, the value of the coordinate X is increased and no data is read out from the memory.

When the process reaches the horizontal blanking period while the loop 2 is cycled (Step S7), the value of X is returned to "1" and the value of Y is increased by "1" (Step S8) and then the steps following the Step S2 are repeatedly executed.

When the process reaches the vertical blanking period, the program returns to Step S1, so that X is reset to "1" while Y is reset to "0".

As a result, a picture regions indicated by ① in FIG. 9 are formed by the fundamental unit PU1.

As is clear from the flowchart shown in FIG. 7B, the processing by the fundamental unit PU2 is substantially similar to that of the fundamental unit PU1. However, the initial value of X is set to "0", so that the picture regions indicated by ② are formed as shown in FIG. 9.

The left-hand half picture region on the left side of the wipe position $X_0$ (See FIG. 9) is formed by the above-described processing by the fundamental units PU1 and PU2.

The picture region on the right side of the wipe position $X_0$ is formed by the fundamental units PU3 and PU4. As is clear from FIGS. 8A and 8B, the processings accomplished by the fundamental units PU3 and PU4 are substantially similar to those accomplished by the fundamental units PU1 and PU2. However, there is a difference between the processings accomplished by the fundamental units PU1 and PU2 and by the fundamental units PU3 and PU4 in that no output is derived from the loop 3 (see FIG. 8A) corresponding to the loop 1 of the fundamental unit PU1, while an output is derived from the loop 4 corresponding to the loop 2 of the fundamental unit PU1. Therefore, only the data for the right-hand half portion of the picture on the right side of the wipe position $X_0$ are outputted, so that the right-hand portion of the picture B is outputted. The relationship between the fundamental units PU3 and PU4 is substantially similar to that between the fundamental units PU1 and PU2.

According to the present embodiment, time axis correction represented by a time base corrector, a frame synchronizer and so on can be accomplished. That is, video signals which are driven separately by different synchronization are converted to be synchronized with the system sync signal.

The flowcharts used to explain the wipe processing steps described above represent one example of algorithms also capable of accomplishing time axis correction. In order to accomplish time axis correction based on the flowcharts shown in FIGS. 7A and 7B, or FIGS. 8A and 8B, the counter 12 shown in FIG. 4 is driven in response to the sync signal of the input signal to generate a write address, so that a video signal is stored in the memory 14 at the write address (see FIG. 3). In the case of readout, as shown in the flowcharts, the data is read out while confirming the vertical and horizontal blanking which are synchronized with the system sync signal and independent from an input video signal.

Thus, the memory 14 accomplishes the function of a buffer, so that time axis correction can be made.

Other examples of video signal processings include geometric processings such as enlargement/reduction, rotation and the like. Such geometric processings have been accomplished by means of a special effect device such as a digital video effector or the like, but according to the present invention these processings can be accomplished by the following processing steps in the present embodiments.

Figure 10:
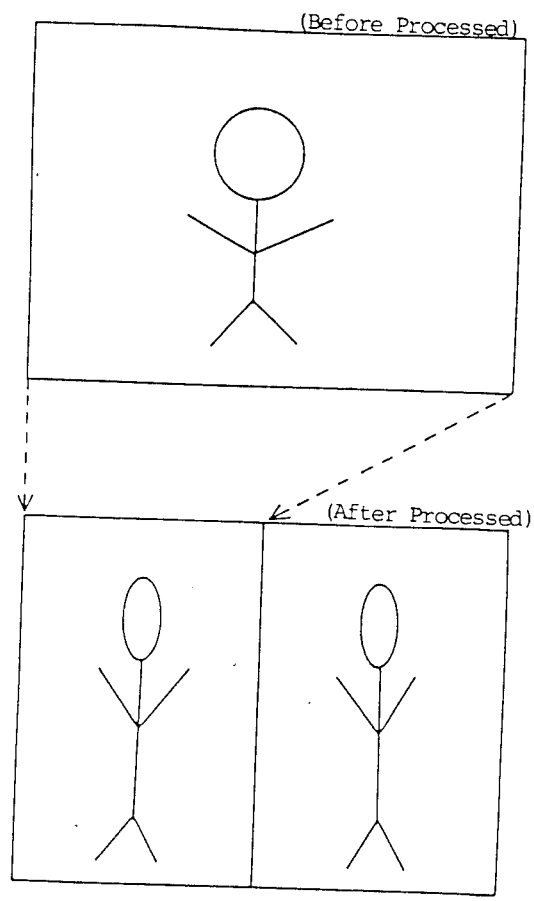
FIG. 10 is an explanatory view used to explain a reducing process in the horizontal direction.

For the sake of simplicity of explanation, let us consider a processing for reducing the horizontal width of a picture to ½ as illustrated in FIG. 10.

Figure 11:
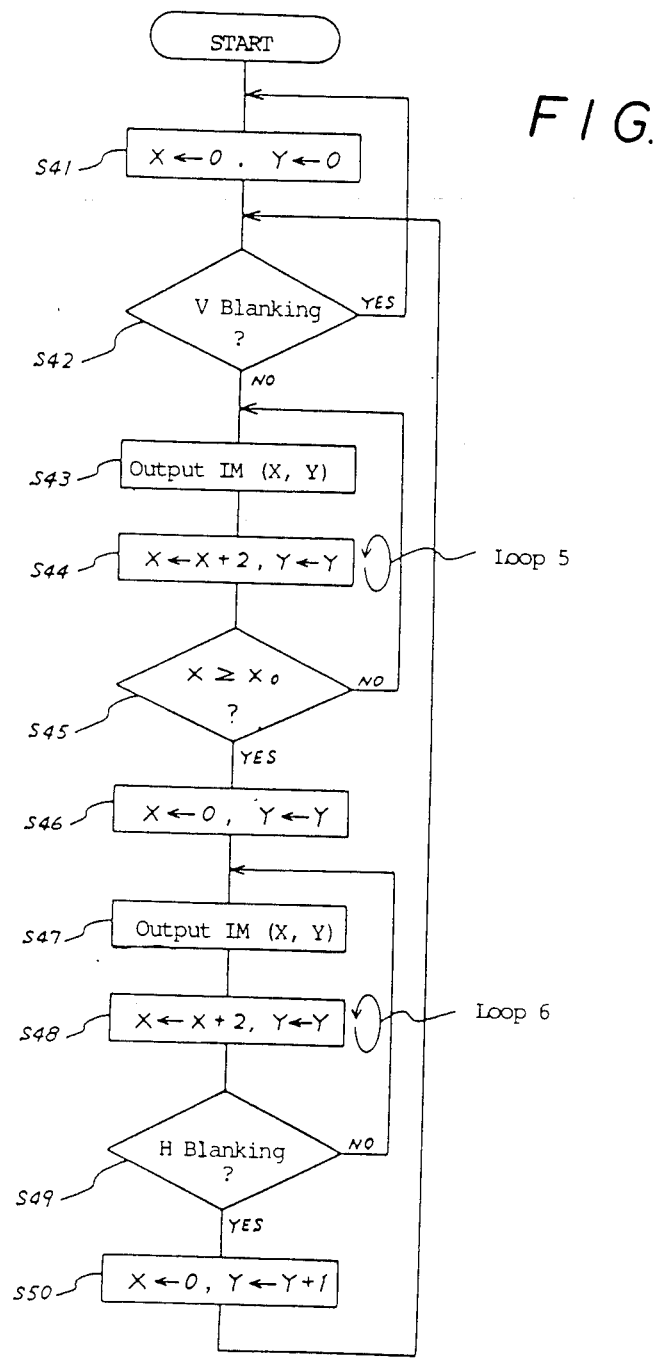
FIG. 11 is a flowchart used to explain an example of an algorithm for the reducing process shown in FIG. 10.

This process can be accomplished by the algorithm shown in FIG. 11, for instance. In FIG. 11, X represents a horizontal address; Y, a vertical address; IM, a video memory data; and $X_0$, the maximum horizontal address of original video data. According to this processing, the read out horizontal address X is incremented by "2" in the loops 5 and 6, so that the horizontal width of a picture is reduced to ½. In order to output two reduced pictures, the loops 5 and 6 are used, and prior to the execution of the loop 6, the X address is reset (to zero) again, so that the same pictures are obtained.

It is now assumed that Ts (the sampling interval of a video signal) is 280 n sec; Tp (the time required to accomplish one step in the present embodiment) is 140 n sec; and n=4 steps are required for each picture element in order to accomplish the above-described reduction (Each of Steps S43–S45 and S47–S49 in FIG. 11 has four steps). Then, the number N of fundamental units required to accomplish the parallel processings is given by $$N = \frac{n}{Ts/Tp} = 2.$$

Therefore, the video signal flow as illustrated by bold lines in FIG. 12. In FIG. 12, PU1 and PU2 represent the identical fundamental units for processing a video signal.

Figure 13A:
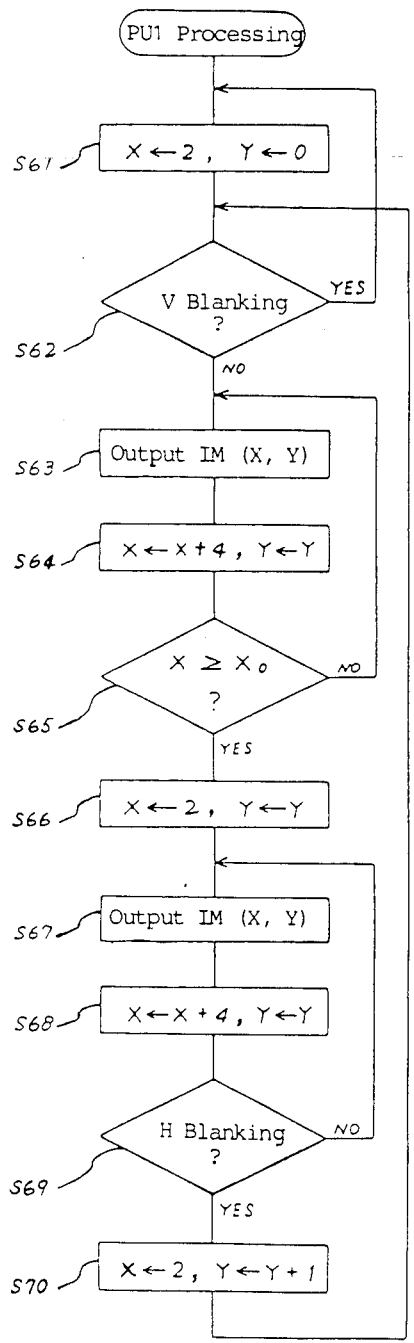
FIGS. 13A and 13B are flowcharts illustrating steps for controlling the system shown in FIG. 12.
Figure 13B:
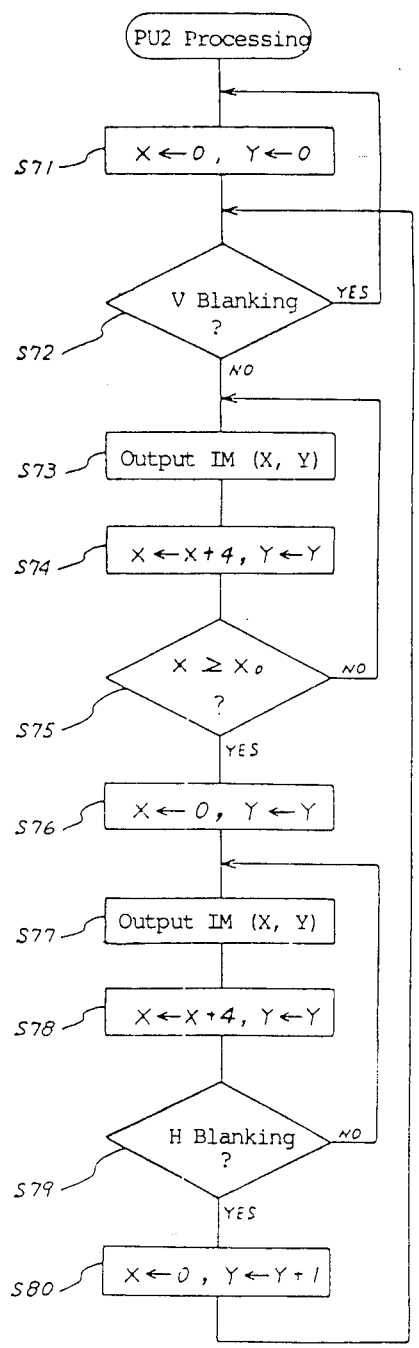

The flowcharts as shown in FIGS. 13A and 13B are an example of algorithms to be executed by the fundamental units shown in FIG. 12. That is, like the case of the wipe processing described hereinbefore, initial values of X are set to "0" and "2" and the X address is incremented by "4".

Figure 14:
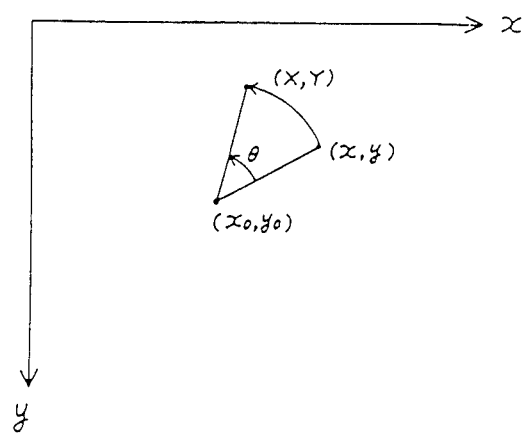
FIG. 14 is an explanatory diagram used to explain a two-dimensional rotation processing.

Next, two-dimensional rotation processing in accordance with the present invention will be described. Referring now to FIG. 14, when a point (x, y) is rotated around a point $(x_0, y_0)$ by $\theta$, the point (x, y) is displaced to a point (X, Y) as indicated by the following equations.

$$X = x \cos \theta + y \sin \theta + x_0(1 - \cos \theta) - y_0 \sin \theta$$

$$Y = -x \sin \theta + y \cos \theta + x_0 \sin \theta + y_0(1 - \cos \theta)$$

In the fundamental unit for processing a video signal in accordance with the present invention, data must be generated according to an output series, so that the following inverse transformation is made:

$$x = X \cos \theta - Y \sin \theta + x_0(1 - \cos \theta) + y_0 \sin \theta$$

$$y = X \sin \theta + Y \cos \theta - x_0 \sin \theta + y_0(1 - \cos \theta)$$

According to the above-described equations, X and Y are incremented by "1" each time of operation and inserted sequentially into the above equations, so that an original picture (x, y) is read out and outputted. The steps for executing this rotation processing are substantially similar to the above-described wipe or reduction processing steps, except that the address computation is slightly increased in this rotation processing.

As described above, according to the present invention, a single hardware device can accomplish various processing of video signals such as processing of a video signal on a time axis, so that the fundamental unit for processing a video signal which can be expanded and is flexible and easy to maintain is obtained.

Furthermore, a plurality of units in accordance with the present invention can be employed to accomplish parallel processing so that a processing speed is increased and thereby video signals can be processed in various processing manners without interruption in real time.

What is claimed is:

1. A fundamental unit for processing video signals, comprising:
    (a) video signal selection means, receiving video signals transmitted through a plurality of first transmission lines, for selecting one of the video signals, the selected video signal having a sync signal;
    (b) memory means for storing therein the selected video signal;
    (c) write control means for controlling said memory means to store the selected video signal as data in said memory means by utilizing the sync signal of said video signal as a control signal;
    (d) readout means for addressing said memory means to read out said data from said memory means;
    (e) arithmetic means for operating arithmetically on said data read out by said readout means;
    (f) output means for outputting, on a respective plurality of second transmission lines, signals selected from the result of the operation of said arithmetic means and the video signals on said first transmission lines; and
    (g) programmable control means for controlling said video signal selection means, said readout means, said arithmetic means, and said output means in accordance with the timing of a system sync signal, said programmable control means having a program memory to store a program for predetermined processing of the selected video signal,
wherein said programmable control means includes means for generating a clock signal, and wherein said write control means includes an address counter which counts said clock signal, said address counter being reset by said sync signal of the selected video signal.

2. A video signal processing system, comprising:
a plurality of fundamental units for processing video signals, each fundamental unit including
    (a) video signal selection means, receiving video signals transmitted through a plurality of first transmission lines, for selecting one of the video signals, the selected video signal having a sync signal;
    (b) memory means for storing therein the selected video signal;
    (c) write control means for controlling said memory means to store the selected video signal as data in said memory means by utilizing the sync signal of the selected video signal as a control signal;
    (d) readout means for addressing said memory means to read out said data from said memory means;
    (e) arithmetic means for arithmetically operating on said data read out by said readout means;
    (f) output means for outputting, on a respective plurality of second transmission lines, signals selected from the result of the operation of said arithmetic means and the video signals on said first transmission lines; and (g) programmable control means for controlling said video signal selection means, said readout means, said arithmetic means, and said output means in accordance with the timing of a system sync signal, said programmable control means having a program memory to store a program for predetermined processing of the selected video signal, wherein the plurality of fundamental processing units are serially connected such that the plurality of second transmission lines of one of the units are respectively connected to the plurality of first transmission lines of the next one of the units.

3. A video signal processing system as claimed in claim 2, wherein said programmable control means comprises means for generating a clock signal, and wherein said write control means comprises an address counter which counts said clock signal, said address counter being reset by said sync signal of the selected video signal.

4. A video signal processing system as claimed in claim 3, wherein said write control means comprises a horizontal address counter and a vertical address counter, each of said counters having a respective countup input and a respective clear input; wherein the sync signal of the selected video signal includes a horizontal sync signal and a vertical sync signal; wherein the programmable control means comprises means for generating a clock signal; wherein said clock signal is applied to the countup input of said horizontal address counter; wherein the horizontal sync signal is applied to the reset input of said horizontal address counter and to the countup input of said vertical address counter; and wherein the vertical sync signal is applied to the reset input of said vertical address counter.

5. A video signal processing system as claimed in claim 2, wherein said readout means comprises an arithmetic logic unit.

6. A video signal processing system as claimed in claim 2, wherein said arithmetic means comprises an arithmetic logic unit.

7. A video signal processing system as claimed in claim 2, wherein said output means selectively passes said data read out from said memory means and said video signals on said first transmission lines under the control of said programmable control means.

8. A fundamental unit for processing video signals, comprising:

(a) video signal selection means, receiving video signals transmitted through a plurality of first transmission lines, for selecting one of the video signals, the selected video signal having a sync signal, the sync signal of the selected video signal including a horizontal sync signal and a vertical sync signal;

(b) memory means for storing therein the selected video signal;

(c) write control means for controlling said memory means to store the selected video signal as data in said memory means by utilizing the sync signal of said video signal as a control signal, said write control means including a horizontal address counter and a vertical address counter, each of said counters having a respective countup input and a respective clear input;

(d) readout means for addressing said memory means to read out said data from said memory means;

(e) arithmetic means for operating arithmetically on said data read out by said readout means;

(f) output means for outputting, on a respective plurality of second transmission lines signals selected from the result of the operation of said arithmetic means and the video signals on said first transmission lines; and (g) programmable control means for controlling said video signal selection means, said readout means, said arithmetic means, and said output means in accordance with the timing of a system sync signal, said programmable control means having a program memory to store a program for predetermined processing of the selected video signal, said programmable control means additionally including means for generating a clock signal, said clock signal being applied to the countup input of said horizontal address counter, wherein the horizontal sync signal is applied to the reset input of said horizontal address counter and to the countup input of said vertical address counter, and wherein said vertical sync signal is applied to the reset input of said vertical address counter.

9. A fundamental unit for processing video signals, comprising:

(a) video signal selection means, receiving video signals transmitted through a plurality of first transmission lines, for selecting one of the video signals, the selected video signal having a sync signal;

(b) memory means for storing therein the selected video signal;

(c) write control means for controlling said memory means to store the selected video signal as data in said memory means by utilizing the sync signal of said video signal as a control signal;

(d) readout means for addressing said memory means to read out said data from said memory means, said readout means including an arithmetic logic unit;

(e) arithmetic means for operating arithmetically on said data read out by said readout means;

(f) output means for outputting, on a respective plurality of second transmission lines one, signal selected from result of the operation of said arithmetic means and the video signals on said first transmission lines; and (g) programmable control means for controlling said video signal selection means, said readout means, said arithmetic means, and said output means in accordance with the timing of a system sync signal, said programmable control means having a program memory to store a program for predetermined processing of the selected video signal.

* * * * *